United States Patent
Garaj et al.

(10) Patent No.: US 11,671,731 B2
(45) Date of Patent: Jun. 6, 2023

(54) APPARATUS FOR FACILITATING A PHOTOVOLTAIC DEVICE TO PROVIDE A WIRELESS COMMUNICATION CHANNEL

(71) Applicant: City University of Hong Kong, Hong Kong (HK)

(72) Inventors: Martin Garaj, Bratislava (SK); Shu Hung Henry Chung, Hong Kong (HK)

(73) Assignee: City University of Hong Kong, Hong Kong (HK)

( * ) Notice: Subject to any disclaimer, the term of this patent is extended or adjusted under 35 U.S.C. 154(b) by 115 days.

(21) Appl. No.: 17/510,369

(22) Filed: Oct. 25, 2021

(65) Prior Publication Data
US 2023/0127342 A1  Apr. 27, 2023

(51) Int. Cl.
*H04Q 11/00* (2006.01)
*H04B 10/524* (2013.01)
*H04B 10/11* (2013.01)
*H04B 10/69* (2013.01)

(52) U.S. Cl.
CPC ......... *H04Q 11/0005* (2013.01); *H04B 10/11* (2013.01); *H04B 10/524* (2013.01); *H04B 10/69* (2013.01); *H04Q 2011/0039* (2013.01); *H04Q 2011/0041* (2013.01)

(58) Field of Classification Search
CPC ....... H04Q 11/0005; H04Q 2011/0039; H04Q 2011/0041; H04B 10/11; H04B 10/524; H04B 10/69
See application file for complete search history.

(56) References Cited

U.S. PATENT DOCUMENTS

| | | | |
|---|---|---|---|
| 5,701,189 A * | 12/1997 | Koda | H04B 10/801 398/118 |
| 7,601,941 B2 | 10/2009 | Fuyuki | |
| 8,674,545 B2 | 3/2014 | Signorelli et al. | |
| 8,901,603 B2 | 12/2014 | Robbins | |
| 9,413,457 B2 | 8/2016 | Pederson et al. | |
| 10,461,570 B2 | 10/2019 | Avrutsky | |
| 2008/0306700 A1 | 12/2008 | Kawam et al. | |
| 2013/0278749 A1* | 10/2013 | Mandelis | G01N 21/9501 348/87 |
| 2016/0056761 A1* | 2/2016 | Mabille | G01N 21/9505 356/237.1 |
| 2018/0262159 A1* | 9/2018 | Deceglie | G01N 21/66 |
| 2019/0200439 A1* | 6/2019 | Broers | H05B 47/115 |

FOREIGN PATENT DOCUMENTS

JP  4885234 B2  2/2012

* cited by examiner

*Primary Examiner* — Mina M Shalaby
(74) *Attorney, Agent, or Firm* — Idea Intellectual Limited; Margaret A. Burke; Sam T. Yip

(57) ABSTRACT

The present invention provides an apparatus for facilitating a photovoltaic device to provide a wireless communication channel. The apparatus comprises a switch connected in parallel with the photovoltaic device and configured for driving the photovoltaic device to produce optical signals carrying sensed data to be transmitted; and a control module connected with the switch and configured for receiving electrical sensing signals and generate a control signal to control the switch. The apparatus provided by the present invention is extremely durable. Compared to existing communication technologies which require extra hardware, the apparatus provided by the present invention is simpler and can be integrated into a single component.

14 Claims, 12 Drawing Sheets

APPARATUS FOR FACILITATING A PHOTOVOLTAIC DEVICE TO PROVIDE A WIRELESS COMMUNICATION CHANNEL

COPYRIGHT NOTICE

A portion of the disclosure of this patent document contains material, which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The present invention generally relates to photovoltaic devices, more specifically, to an apparatus for facilitating a photovoltaic device to provide a wireless communication channel.

BACKGROUND OF THE INVENTION

Due to growing energy demand and further integration of photovoltaics into buildings, vehicles, infrastructure (roads), etc., it can be fairly predicted that photovoltaic devices will become ubiquitous in upcoming decades. Despite the foreseen omnipresence of these devices, they are considered as passive energy generators, as their maximum power output is determined by available sunlight, which depends on environmental conditions.

Unmanned vehicles with high level of autonomy such as unmanned aerial vehicles (UAVs) are being deployed to collect key visual data without the need for physically presence of inspectors in almost every industry that requires visual inspections as part of its maintenance procedures or engineering developments, especially in challenging and dynamic environments. For examples, inspection of smart-building windows incorporated photovoltaic devices, or even electrical vehicles (EVs) equipped with photovoltaic modules when parking in a street.

Recent developments in photovoltaic (PV) technology have made solar power a viable alternative for powering unmanned vehicles. It is always desirable to have a cost-effective way of wireless communication between unmanned vehicles and the infrastructures/utilities being inspected.

SUMMARY OF THE INVENTION

One objective of the present invention is to provide a cost-effective method to provide communication channel by enhancing the capabilities of photovoltaic devices, from passive energy generators to active transmitters of information. Another objective of the present invention is to provide a photovoltaic device-compatible communication channel to replace the conventional radio-based omnidirectional communication channel for high locality communication and cost saving.

According to one aspect of the present invention, an apparatus is provided for facilitating a photovoltaic device to provide a wireless communication channel. The apparatus comprises a switch connected in parallel with the photovoltaic device and configured for driving the photovoltaic device to produce optical signals carrying sensed data to be transmitted; and a control module connected with the switch and configured for receiving electrical sensing signals and generate a control signal to control the switch. The control module comprises a memory, a state machine and a communication protocol logic. The state machine is configured for receiving a current sensing signal provided for indicating a direction of an electrical current flowing through the photovoltaic device for determining whether the photovoltaic device is operated in a generative mode or a diagnosis mode; receiving a voltage sensing signal provided for indicating a change in a voltage across the photovoltaic device in response to illumination by an artificial light when the photovoltaic device is operated in a diagnostics mode; and generating a transmission enabling signal based on the current sensing signal and the voltage sensing signal.

Since the transmission of information is based on physical phenomena of electroluminescence which are inherent to the photovoltaic material, the apparatus provided by the present invention is extremely durable, as the photovoltaic devices have lifespan in decades. Compared to other existing communication technologies which require extra hardware (antennas, radio-signal generators, oscillators, etc.), the apparatus provided by the present invention is simpler and can be integrated into a single component.

BRIEF DESCRIPTION OF THE DRAWINGS

Embodiments of the invention are described in more detail hereinafter with reference to the drawings, in which.

DETAILED DESCRIPTION

In the following description, exemplary embodiments of the present invention are set forth as preferred examples. It will be apparent to those skilled in the art that modifications, including additions and/or substitutions may be made without departing from the scope and spirit of the invention.

Specific details may be omitted so as not to obscure the invention; however, the disclosure is written to enable one skilled in the art to practice the teachings herein without undue experimentation.

Figure 1:
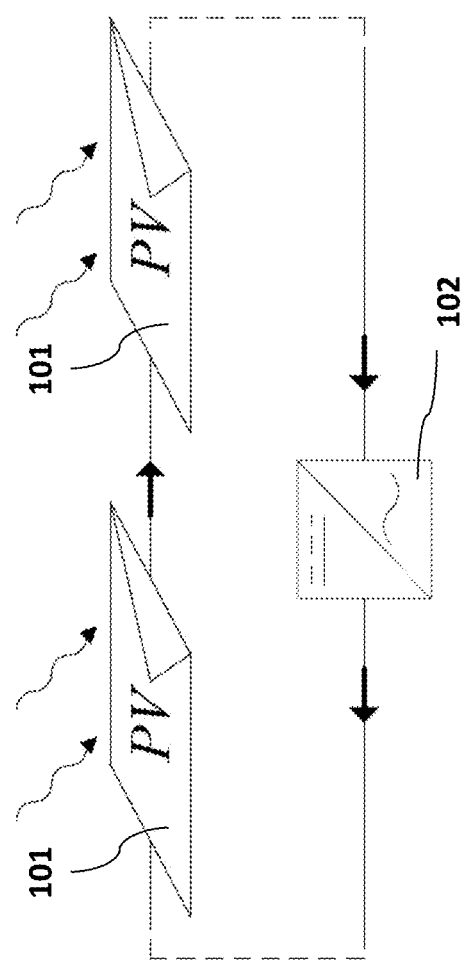
FIG. 1 shows how a regular implementation of photovoltaic system for transforming sunlight into electrical current.

FIG. 1 shows how a regular implementation of photovoltaic (PV) system for transforming sunlight (depicted as wavy arrows) into electrical current (depicted as thick arrows). The PV system includes one or more PV modules 101 connected in series with a power processing device 102. The power processing device 102 can be any type of power inverter or converter, such as DC-DC inverter/converter.

Figure 2:
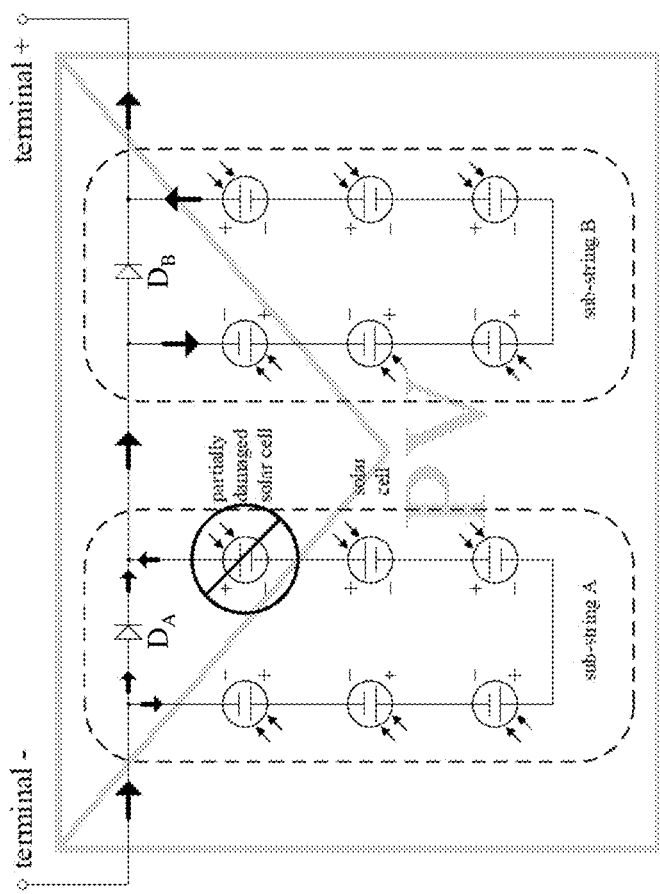
FIG. 2 shows a detailed view of an internal structure of the photovoltaic module in normal operation.

FIG. 2 shows an internal structure of the PV module 101 in normal operation. As shown in FIG. 2, the PV module 101 comprises one or more substrings A, B, each including a group of PV cells (or solar cells) connected in series with each other. Each of the substrings A, B is connected in parallel with a bypass diode $D_A$, $D_B$. In normal operation (or in generative mode) and under illumination of sunlight, the PV cells are forward-biased and configured to absorb solar energy and generate electrical current. In this embodiment, the bypass diode $D_A$ connected in parallel with substring A is partially conductive due to one of the PV cells in substring A is partially damaged.

Figure 3:
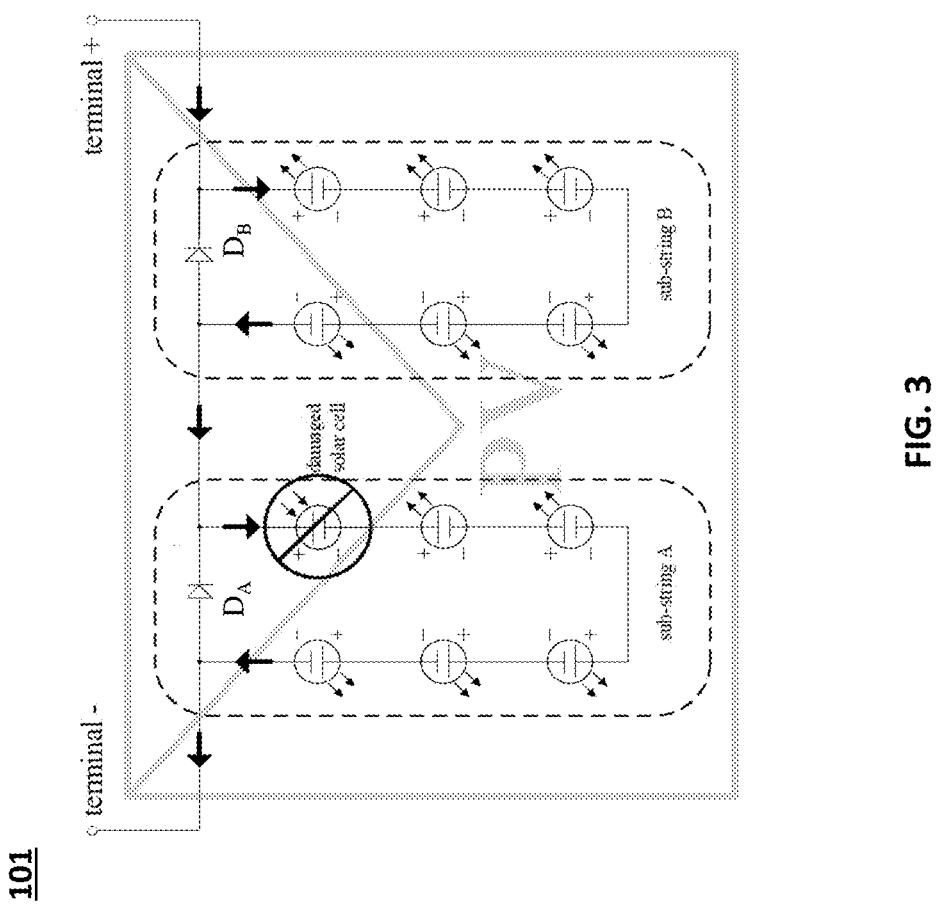
FIG. 3 shows a detailed view of an internal structure of the photovoltaic module under inspection.

FIG. 3 shows an internal structure of the PV module 101 under inspection (or in diagnostics mode). The PV cells are forward-biased and configured to emit light in near-infra-red (NIR) spectrum due to the electroluminescent effect. Where there are connection issues, for example, a PV cell is cracked, or there are any damages blocking the electrical current from passing through a particular area of the PV cell, only that particular area of the PV cell does not emit NIR light. The bypass diode is reverse-biased and therefore not interfering with the inspection process.

Figure 4:
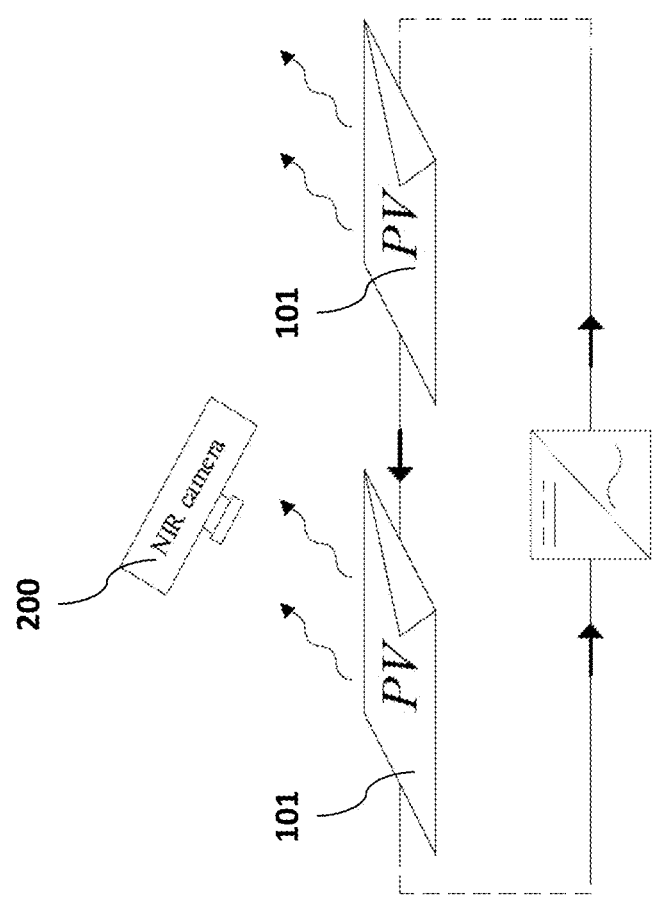
FIG. 4 shows a simplified setup for inspection of a photovoltaic system.

FIG. 4 shows a simplified setup for inspection of a PV system including one or more PV modules (or devices) 101. As shown in FIG. 4, a NIR camera 200 is used to capture the NIR light emitted from the PV devices 101 which are forward-biased. The principle of electroluminescence is based on electrical current being fed back to the PV devices 101, such that the PV devices 101 convert part of the energy into NIR light that is emitted into environment. Therefore, each of the PV devices 101 can be used as an opto-electronic device for transmitting optical signals by modulating the electrical current signals passing therethrough.

Figure 5:
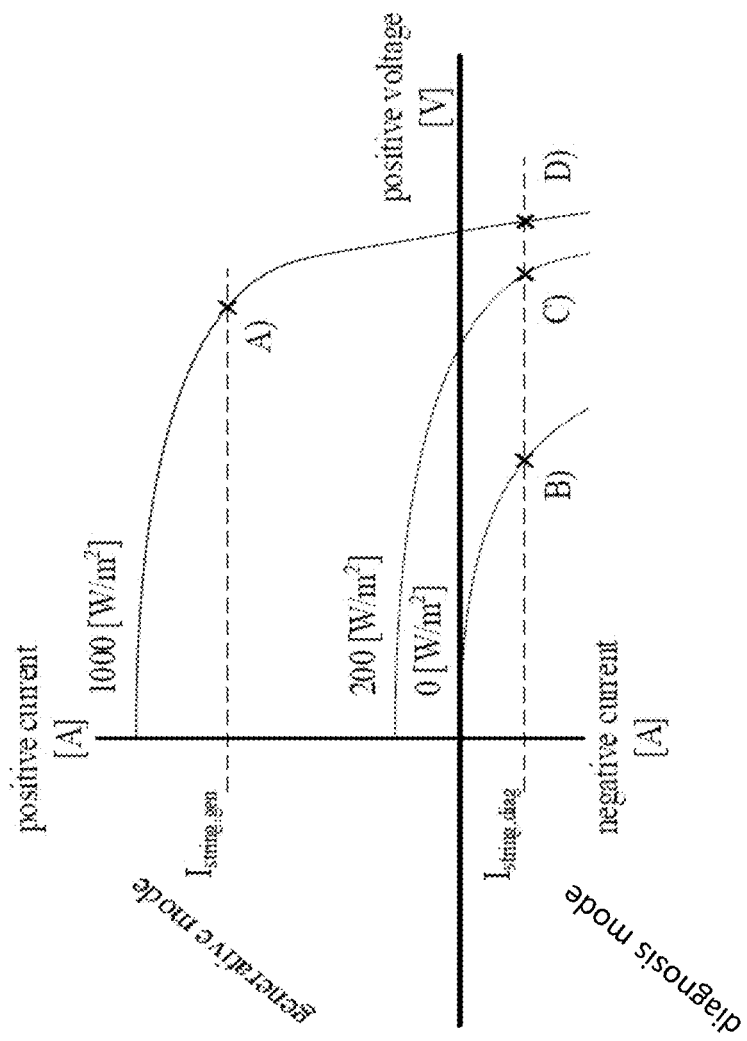
FIG. 5 shows a voltage-current characteristic for a generic PV device.

Referring to a voltage-current characteristic for a generic PV device as shown in FIG. 5, when the PV device is forward-biased to achieve the electroluminescent effect, the current $I_{string}$ is negative. Disregarding the current direction, the PV effect causes a change in voltage under all operating circumstance, A) in generative mode, B), C) and D) in diagnosis mode.

Therefore, a wireless optical communication channel can be implemented by utilizing measurable changes in voltage and current caused by PV effect (change in voltage) and driving the PV device in generative or diagnostic mode (change in current direction).

Figure 6:
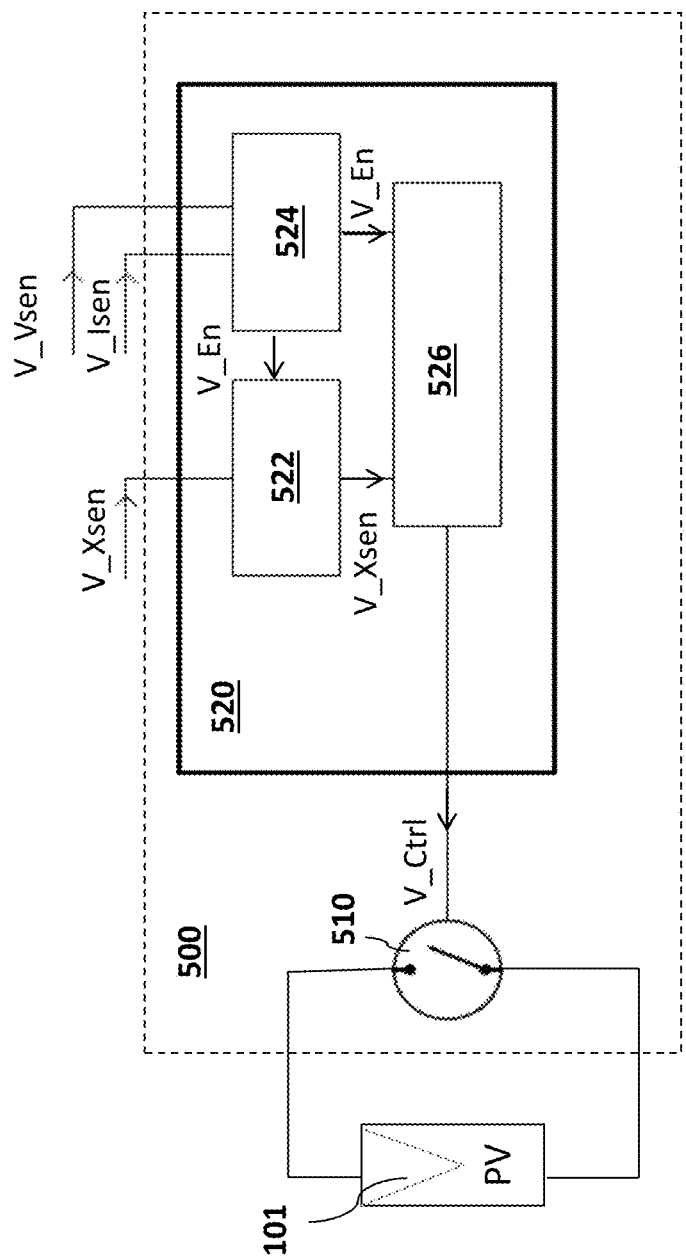
FIG. 6 shows an apparatus for facilitating a photovoltaic device to provide a wireless communication channel according to one embodiment of the present invention.

FIG. 6 shows an apparatus 500 for facilitating a PV device 101 to provide a wireless communication channel according to one embodiment of the present invention. As shown in FIG. 6, the apparatus 500 includes a switch 510 connected in parallel with the PV device 101 and a control module 520 connected to the switch 510 and configured for generating a control signal V_Ctrl for controlling the switch 510.

The switch 510 is controlled to switch between two states with the control signal generated by the control module 520. If the control signal has a high-level value representing a logical value of "1", the switch 510 is controlled to be at a ON (or close) state for conducting current. If the control signal has a low-level value representing a logical value of "0", the switch 510 is controlled to be at an OFF (or open) state for blocking current.

The control module 520 includes a memory 522 configured for receiving a parameter sensing signal V_Xsen carrying sensed parameter data to be transmitted and recording the sensed parameter data. The sensed parameter data may be a sensed value of, for example but not limited to, temperature, electrical current, electrical voltage, or other parameters of interest.

The control module 520 further includes a state machine 524 configured for receiving a voltage sensing signal V_Vsen and/or a current sensing signal V_Isen; determining whether transmission of information is to be conducted based on the voltage sensing signal V_Vsen and/or the current sensing signal V_Isen; and generating a transmission enabling signal V_En based on the voltage sensing signal V_Vsen and/or the current sensing signal V_Isen.

When transmission of information is to be conducted, the state machine 524 generates a transmission enabling signal V_En having a high-level value representing a logical value of "1". When transmission of information is not to be conducted, the state machine 524 generates a transmission enabling signal V_En having a low-level value representing a logical value of "0".

The control module 520 further includes a communication protocol logic 526 connected with the memory 522, the state machine 524 and the switch 510; and configured for receiving the parameter sensing signal V_Xsen from the memory 522 and the transmission enabling signal V_En from the state machine 524; and modulating a pulse signal, such that value of the sensing signal V_Xsen stored in memory is used to to generate the control signal V_Ctrl for controlling the switch 510 when the transmission enabling signal V_En has a high-level value.

The current sensing signal V_Isen may be provided by a current sensor (not shown) configured to detect a direction of a current flowing through the PV device 101. Positive current direction means that the PV device being operated in a generative mode. Negative current direction means that the PV device being operated in a diagnosis mode. When the sensed current direction is positive, the current sensing signal V_Isen has a high-level value representing a logical value of "1". When the sensed current direction is negative, the current sensing signal V_Isen has a low-level value representing a logical value of "0".

By making use of the PV effect that voltage across a PV device rises when the PV device is illuminated, the voltage sensing signal V_Vsen may be provided by a voltage sensor (not shown) configured to detect a change in voltage across the PV device in response to illumination by an artificial light when the PV device is forward-biased. In particular, when a change in voltage across the PV device is detected, the voltage sensing signal V_Vsen has a high-level value representing a logical value of "1". When no change in voltage across the PV device is detected, the voltage sensing signal V_Vsen has a low-level value representing a logical value of "0".

In various embodiments, the artificial light may be provided by an external optical source. For example, when the PV panel is inspected by a UAV, the artificial light may be provided by an optical transmitter installed in the UAV as a trigger signal for triggering the transmission of sensed parameter data to the UAV.

Figure 7:
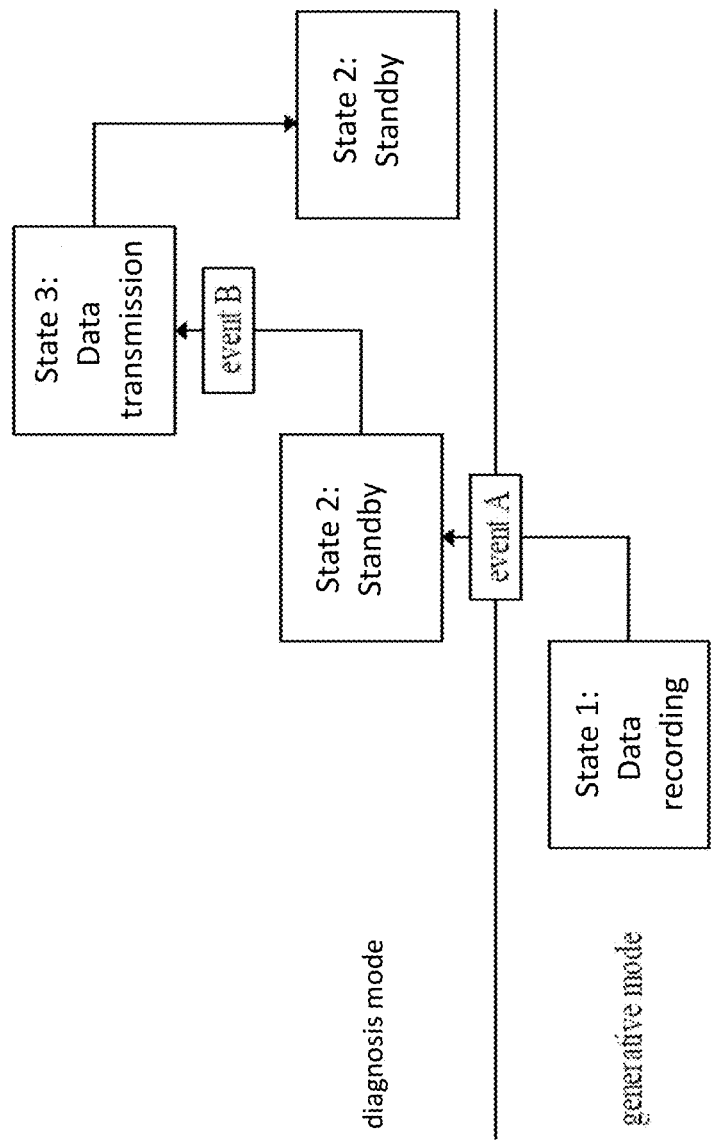
FIG. 7 shows operation mechanism of a state machine according to the present invention.

The operation mechanism of the state machine 524 is illustrated in FIG. 7. As illustrated, the operation of the state machine 524 may use the direction of electrical current flowing through the PV device as an event A and the change in voltage across the PV device as event B for transition between states. The state machine 524 may be configured to, based on real-world scenario, when the device is instructed externally to start the transmitting, then transmits the information and returns back to stand-by state.

Definition of states and events of the state machine 524 are as follows:

State 1: data recording—the parameter sensing signal V_Xsen is received and a corresponding sensing data is recorded in memory; the PV device is operated in generative mode and the direction of electrical current is positive, causing the current sensing signal V_Isen to have a high-level value;

Event A—the PV device enters diagnostics mode of operation and the direction of electrical current is negative, causing the current sensing signal V_Isen to have a low-level value;

State 2: standby—waiting for trigger signal;

Event B—there is a change in voltage across the PV device due to external artificial illumination, causing the voltage sensing signal V_Vsen to have a high-level value;

State 3: data transmission—the communication protocol logic receives the sensing data from the memory and generate control signals to the switch to cause the PV device to emit NIR optical signals carrying the sensing data.

Accordingly, at the data recording state or stand-by state (i.e., State 1 or 2), the transmission enabling signal V_En has a low-level value representing a logical value of "0". At the data transmission state (i.e., State 3), the transmission enabling signal V_En has a high-level value representing a logical value of "1".

In various embodiments, the PV device may be a single PV cell, a substring of PV cells or a PV module including one or more substrings of PV cells.

Figure 8:
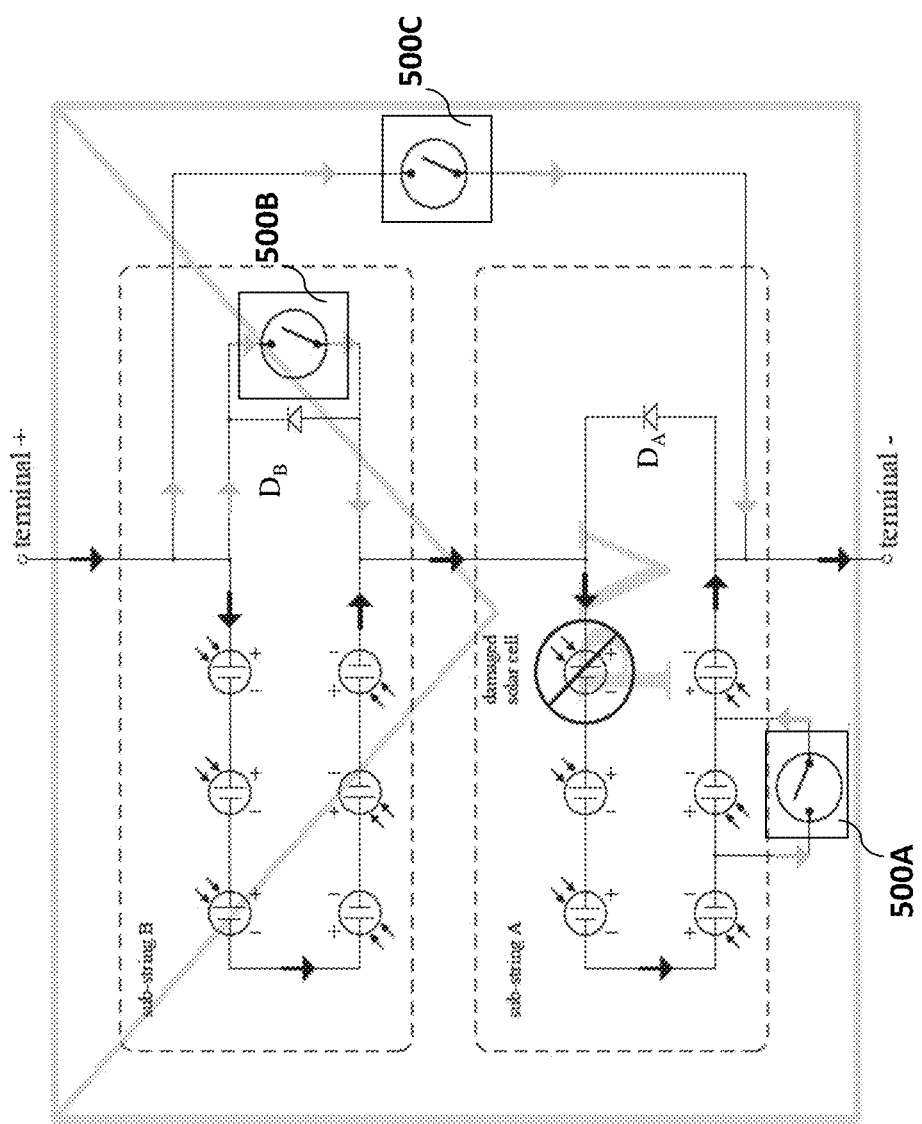
FIG. 8 shows how the apparatus according to the present invention can be connected with a PV cell, a substring of PV cells and a PV module including one or more substrings of PV cells.
Figure 9:
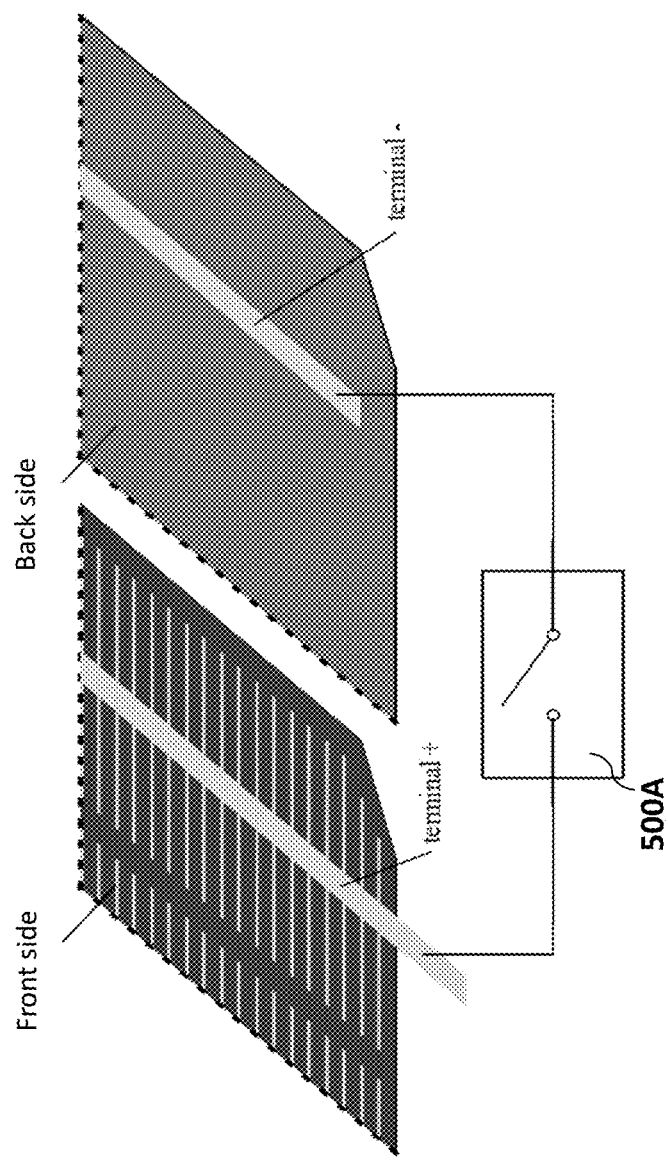
FIG. 9 shows how the apparatus according to the present invention is connected across a pair bus-bars (terminal+ and terminal−) on front side and back sides of a generic crystalline photovoltaic cell.

As shown in FIG. 8, an apparatus 500A according to the present invention may be connected in parallel with a PV cell. In some embodiments, the apparatus 500A may be connected across a pair bus-bars (terminal+ and terminal−) on front side and back sides of a generic crystalline PV cell as shown in to FIG. 9.

Figure 10:
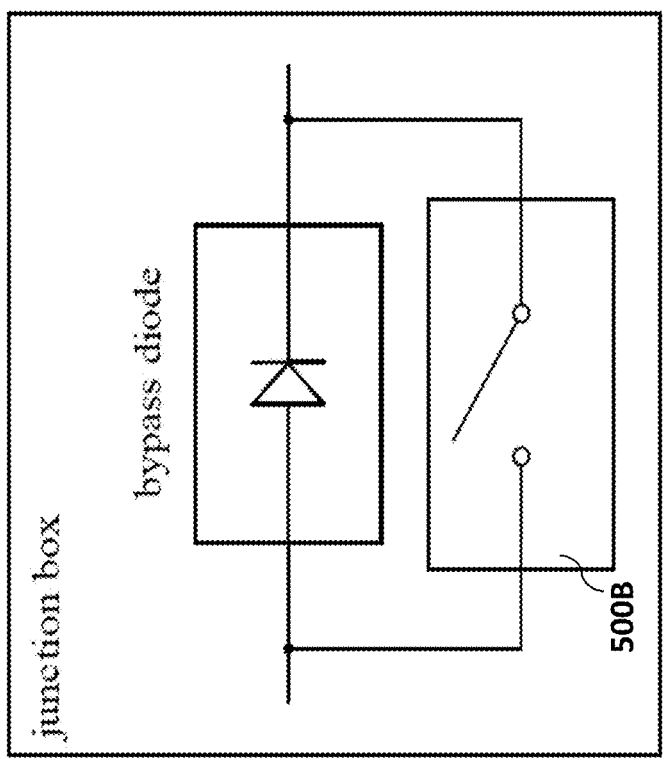
FIG. 10 shows how the apparatus according to the present invention and the bypass diode are connected in parallel to form a junction box module.

Referring back to FIG. 8, an apparatus 500B according to the present invention may be connected in parallel with a bypass diode as well as a substring of PV cells. In some embodiments, the apparatus 500B and the bypass diode may be connected in parallel to form a junction box module as shown in FIG. 10, which is to be installed in parallel with the substring of PV cells. The junction box may be placed on the back side of the PV module.

Referring back to FIG. 8, an apparatus 500C according to the present invention may be connected across a PV module including two or more substrings of PV cells.

Figure 11B:
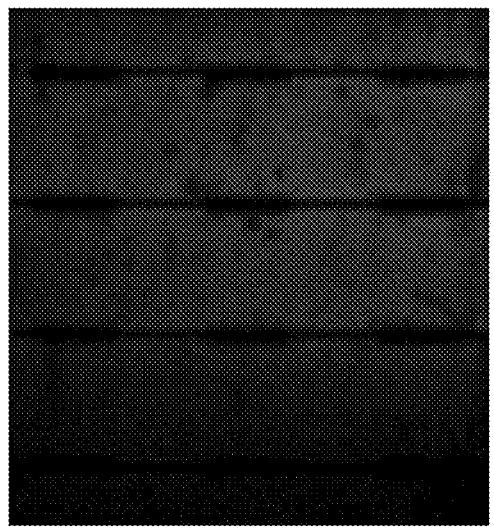
FIGS. 11A and 11B show electroluminescent images of a PV module controlled with an apparatus according to the present invention.
Figure 11A:

FIGS. 11A and 11B show electroluminescent images of a PV module controlled with an apparatus according to the present invention. As shown in FIG. 11A, when the switch of the apparatus is conducting, the electrical current passes through the PV module, therefore NIR light is emitted by the PV module. As shown in FIG. 11B, when the switch of the apparatus is not conducting, no/less current passes through the PV module, therefore no/minimum NIR light is emitted by the PV module.

Figure 12:
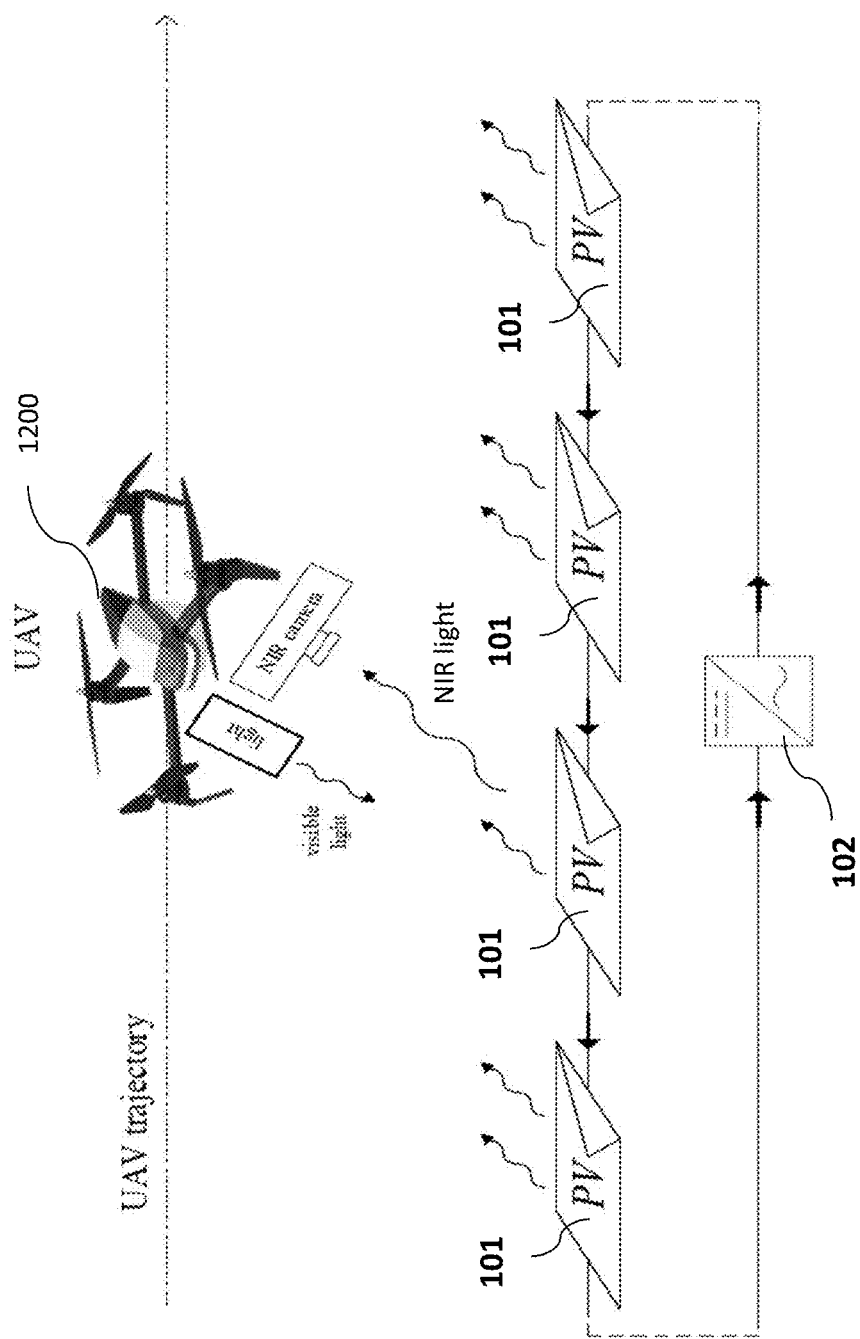
FIG. 12 shows how a plurality of PV devices is configured to communicate with a UAV according to the present invention.

FIG. 12 shows how a plurality of PV devices is configured to communicate with a UAV according to the present invention. As shown in FIG. 12, a plurality of PV devices 101 is installed in a PV system. Each photovoltaic device is equipped with an apparatus for facilitating the photovoltaic device to provide a wireless communication channel for communicating with a UAV 1200 inspecting the PV system. The UAV may include an optical transmitter for emitting visible light as a trigger signal for triggering the PV devices to emit NIR light for transmission of sensed parameter data to the UAV. The UAV may further include a NIR camera for receiving the emitted NIR light emitted by the PV devices.

The foregoing description of the present invention has been provided for the purposes of illustration and description. It is not intended to be exhaustive or to limit the invention to the precise forms disclosed. The embodiments were chosen and described in order to best explain the principles of the invention and its practical application, thereby enabling others skilled in the art to understand the invention for various embodiments and with various modifications that are suited to the particular use contemplated.

The apparatuses and the methods in accordance to embodiments disclosed herein may be implemented using computing devices, computer processors, or electronic circuitries and other programmable logic devices configured or programmed according to the teachings of the present disclosure. Computer instructions or software codes running in the computing devices, computer processors, or programmable logic devices can readily be prepared by practitioners skilled in the software or electronic art based on the teachings of the present disclosure.

What is claimed is:

1. An apparatus for facilitating a photovoltaic device to provide a wireless communication channel, comprising:
    a switch connected in parallel with the photovoltaic device and configured for driving the photovoltaic device to produce optical signals carrying sensed data to be transmitted; and
    a control module connected with the switch and configured for receiving electrical sensing signals and generate a control signal to control the switch.

2. The apparatus according to claim 1, wherein:
    when the control signal has a high-level value representing a logical value of "1", the switch is controlled to be at a close state for conducting current; and
    when the control signal has a low-level value representing a logical value of "0", the switch is controlled to be an open state for blocking current.

3. The apparatus according to claim 1, wherein the control module comprises a memory configured for:
    receiving a parameter sensing signal carrying the sensed data to be transmitted; and
    recording the sensed data.

4. The apparatus according to claim 3, wherein the control module further comprises a state machine configured for:
    receiving a current sensing signal for indicating a direction of an electrical current flowing through the photovoltaic device for determining whether the photovoltaic device is operated in a generative mode or a diagnosis mode;
    receiving a voltage sensing signal provided for indicating a change in a voltage across the photovoltaic device in response to illumination by an artificial light when the photovoltaic device is operated in a diagnostics mode; and
    generating a transmission enabling signal based on the current sensing signal and the voltage sensing signal.

5. The apparatus according to claim 4, wherein:
the current sensing signal is provided by a current sensor configured to detect the direction of an electrical current flowing through the photovoltaic device for determining whether the photovoltaic device is operated in a generative mode or a diagnosis mode; and
the voltage sensing signal is provided by a voltage sensor configured to detect the change in a voltage across the photovoltaic device in response to illumination by an artificial light when the photovoltaic device is operated in a diagnostics mode.

6. The apparatus according to claim 5, wherein the transmission enabling signal has a high-level value when the current sensing signal has a low-level value and the voltage sensing signal has a high-level value.

7. The apparatus according to claim 6, wherein
the control module further comprises a communication protocol logic connected with the memory, the state machine and the switch and configured for:
receiving the parameter sensing signal from the memory and the transmission enabling signal from the state machine; and
modulating a pulse signal with the parameter sensing signal to generate the control signal for controlling the switch when the transmission enabling signal has a high-level value.

8. A photovoltaic system comprising one or more apparatuses for facilitating with one or more photovoltaic devices in the photovoltaic panel to provide one or more optical communication channels, each of the one or more apparatuses comprising:
a switch connected in parallel with a corresponding photovoltaic device and configured for driving the corresponding photovoltaic device to produce optical signals carrying sensed data to be transmitted; and
a control module connected with the switch and configured for receiving electrical sensing signals and generate a control signal to control the switch.

9. The photovoltaic system according to claim 8, wherein:
when the control signal has a high-level value representing a logical value of "1", the switch is controlled to be at a close state for conducting current; and
when the control signal has a low-level value representing a logical value of "0", the switch is controlled to be an open state for blocking current.

10. The photovoltaic system according to claim 8, wherein the control module comprises a memory configured for:
receiving a parameter sensing signal carrying the sensed data to be transmitted; and
storing the sensed data to be transmitted.

11. The photovoltaic system according to claim 10, wherein the control module further comprises a state machine configured for:
receiving a current sensing signal for indicating a direction of an electrical current flowing through the photovoltaic device for determining whether the photovoltaic device is operated in a generative mode or a diagnosis mode;
receiving a voltage sensing signal provided for indicating a change in a voltage across the photovoltaic device in response to illumination by an artificial light when the photovoltaic device is operated in a diagnostics mode; and
generating a transmission enabling signal based on the current sensing signal and the voltage sensing signal.

12. The photovoltaic system according to claim 11, wherein:
the current sensing signal is provided by a current sensor configured to detect the direction of an electrical current flowing through the photovoltaic device for determining whether the photovoltaic device is operated in a generative mode or a diagnosis mode; and
the voltage sensing signal is provided by a voltage sensor configured to detect the change in a voltage across the photovoltaic device in response to illumination by an artificial light when the photovoltaic device is operated in a diagnostics mode.

13. The photovoltaic system according to claim 12, wherein the transmission enabling signal has a high-level value when the current sensing signal has a low-level value and the voltage sensing signal has a high-level value.

14. The photovoltaic system according to claim 13, wherein the control module further comprises a communication protocol logic connected with the memory, the state machine and the switch and configured for:
receiving the parameter sensing signal from the memory and the transmission enabling signal from the state machine; and
modulating a pulse signal with the parameter sensing signal to generate the control signal for controlling the switch when the transmission enabling signal has a high-level value.

* * * * *